US012117361B2

(12) United States Patent
Zhang et al.

(10) Patent No.: US 12,117,361 B2
(45) Date of Patent: Oct. 15, 2024

(54) METHOD FOR SUPPRESSING COHERENT AND POLARIZATION-INDUCED FADING BY SIMULTANEOUS MONITORING OF LOSS AND VIBRATION

(71) Applicant: NANJING UNIVERSITY, Nanjing (CN)

(72) Inventors: Yixin Zhang, Nanjing (CN); Xiaohong Chen, Nanjing (CN); Xuping Zhang, Nanjing (CN); Shuai Tong, Nanjing (CN); Lei Liang, Nanjing (CN); Yiming Wan, Nanjing (CN); Feng Wang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 267 days.

(21) Appl. No.: 17/908,248

(22) PCT Filed: Mar. 23, 2022

(86) PCT No.: PCT/CN2022/082419
§ 371 (c)(1),
(2) Date: Aug. 31, 2022

(87) PCT Pub. No.: WO2022/227948
PCT Pub. Date: Nov. 3, 2022

(65) Prior Publication Data
US 2023/0273092 A1 Aug. 31, 2023

(30) Foreign Application Priority Data
Apr. 26, 2021 (CN) .......................... 202110453267.6

(51) Int. Cl.
G01M 11/00 (2006.01)
(52) U.S. Cl.
CPC .............................. G01M 11/3145 (2013.01)

(58) Field of Classification Search
CPC .................................................. G01M 11/3145
(Continued)

(56) References Cited

U.S. PATENT DOCUMENTS

2013/0077979 A1* 3/2013 Dou ................... H04B 10/2543
398/192
2013/0216238 A1* 8/2013 Dou ................... H04B 10/2543
398/193
(Continued)

FOREIGN PATENT DOCUMENTS

CN  111609919 A  9/2020
CN  112595492 A  4/2021
(Continued)

OTHER PUBLICATIONS

Hu et al; Performance Enhancement Methods for the Distributed Acoustic Sensors Based on Frequency Division Multiplexing; May 2019; MDPI; pp. 1-22. (Year: 2019).*
(Continued)

Primary Examiner — Amritbir K Sandhu
(74) Attorney, Agent, or Firm — Bayramoglu Law Offices LLC

(57) ABSTRACT

A method for suppressing coherent and polarization-induced fading by simultaneous monitoring of loss and vibration is provided. By using merely common single-mode sensing fibers, the polarization diversity-based measurement method solves the conflict between Φ-OTDR and COTDR in terms of polarization state. In addition, the method not only achieves a better coherent fading noise suppression effect but also enhances the capability of recognizing small loss events in the monitoring of loss parameters. Meanwhile, the method can suppress the influence of coherent fading on the phase demodulation of Φ-OTDR and reconstruct a vibration signal with high fidelity in the monitoring of perturbation (Continued)

parameters, which can effectively reduce the error rate of external perturbation warning.

5 Claims, 8 Drawing Sheets

(58) Field of Classification Search
USPC .......................................................... 398/116
See application file for complete search history.

(56) References Cited

U.S. PATENT DOCUMENTS

| 2016/0187224 | A1 | | 6/2016 | Chen et al. | |
|---|---|---|---|---|---|
| 2018/0123700 | A1 | * | 5/2018 | Li | H04J 14/06 |
| 2023/0273092 | A1 | * | 8/2023 | Zhang | G01M 11/3181 |
| | | | | | 356/73.1 |

FOREIGN PATENT DOCUMENTS

| CN | 113176075 A | * | 7/2021 | ......... G01D 5/35361 |
|---|---|---|---|---|
| CN | 117129023 A | * | 11/2023 | |

OTHER PUBLICATIONS

Guerrier et al; (Introducing Coherent MIMO Sensing, a fading-resilient, polarization-independent approach to -OTDR ;Jun. 2020; Optical society of America; pp. 1-14. (Year: 2020).*

* cited by examiner

METHOD FOR SUPPRESSING COHERENT AND POLARIZATION-INDUCED FADING BY SIMULTANEOUS MONITORING OF LOSS AND VIBRATION

CROSS REFERENCE TO THE RELATED APPLICATIONS

This application is the national phase entry of International Application No. PCT/CN2022/082419, filed on Mar. 23, 2022, which is based upon and claims priority to Chinese Patent Application No. 202110453267.6, filed on Apr. 26, 2021, the entire contents of which are incorporated herein by reference.

TECHNICAL FIELD

The present disclosure relates to the technical field of optical fiber sensing and, in particular, to a method for suppressing coherent and polarization-induced fading by simultaneous monitoring of loss and vibration.

BACKGROUND

The coherent optical time domain reflectometry (COTDR) converts an optical Rayleigh backscattering signal (RBS) into an electric signal of a specific intermediate frequency by means of coherent detection. Most amplified spontaneous emission (ASE) noise is suppressed by performing electrical narrow-band filtering on the intermediate frequency signal, such that the COTDR can monitor a multi-relay ultra-long-haul optical fiber communication link. In recent years, the COTDR technology has been improved continuously, primarily improving the bandwidth utilization efficiency of a monitoring channel based on the frequency division multiplexing technology to reduce the measurement time. However, the target parameter is still limited to the monitoring of optical fiber loss parameter. Therefore, a COTDR-based optical fiber link monitoring system can only perform fault diagnosis and localization. In fact, before the appearance of real irreversible damage even though the loss value has not yet changed significantly, potential threats in the ambient environment of the link often cause a perturbation to the fiber optic cable through direct contact or indirect vibration signal transmission, thus providing a basis for early warning. In terms of perturbation monitoring, with the advantages of high sensitivity and fast response, the phase-sensitive optical time-domain reflectometry (Φ-OTDR) has become a research focus of submarine cable monitoring technology.

Both the Φ-OTDR and the COTDR use lasers with narrow linewidth and small frequency drift as a light source, and heterodyne detection Φ-OTDR and COTDR systems are also highly similar in structure. To enable the optical fiber monitoring system to monitor vibration and loss simultaneously, the Φ-OTDR and COTDR technologies can be combined. However, the integration of the two measurement principles has many contradictions and problems. For example: (1) In order to obtain high monitoring accuracy, the Φ-OTDR system requires adjacent RBS curves to have high similarity; therefore, a frequency-stable light source is required. The COTDR requires active sweeping and multi-point digital averaging to suppress coherent fading noise, resulting in conflicting requirements on light source operating modes. (2) For the Φ-OTDR, the change of the polarization state will introduce a time-varying polarization component into a detection signal, which affects the vibration measurement accuracy. A scrambler is generally used in the COTDR to quickly perturb the polarization state of an optical local oscillator (OLO) to suppress the polarization fading noise caused by the mismatch between an RBS and the OLO polarization state. This contradicts the requirement of the Φ-OTDR for a highly stable polarization state. (3) There are two Φ-OTDR demodulation methods currently: an amplitude-discriminative method and a phase-discriminative method. The amplitude-discriminative demodulation method quickly locates a vibration event according to amplitude information of the RBS. Since there is no clear linear relationship between an amplitude change of the RBS and a dynamic strain of the optical fiber caused by the vibration event, the amplitude-discriminative demodulation method is generally only capable of qualitative measurement but cannot reconstruct time-frequency characteristics of a perturbation event with high fidelity. The phase-discriminative demodulation method uses a linear relationship between a phase change of the RBS and a dynamic strain in a local region of the optical fiber, which can accurately restore a perturbation event and improve the accuracy of subsequent mode recognition. However, due to coherent fading, the intensity in certain regions of the optical fiber is close to zero, and phase demodulation results in these regions are prone to a sharp deterioration of the signal-to-noise ratio, which leads to frequent false alarms.

SUMMARY

The technical solution to be solved by the present disclosure is to provide a method for suppressing coherent and polarization-induced fading by simultaneous monitoring of loss and vibration. The present disclosure adopts a new design method, which can implement early warning of a perturbation event while monitoring loss of an optical fiber link.

To solve the foregoing technical problem, the present disclosure adopts the following technical solution: The present disclosure designs a method for suppressing coherent and polarization-induced fading by simultaneous monitoring of loss and vibration. The method includes step A to step F for two orthogonal polarization state intermediate frequency signals obtained through polarization diversity detection for a fiber under test (FUT).

step A: Separately performing IQ demodulation on a P-polarization state intermediate frequency signal and an S-polarization state intermediate frequency signal in the two orthogonal polarization state intermediate frequency signals to obtain a P-polarization state amplitude distribution matrix and a P-polarization state phase distribution matrix corresponding to the P-polarization state intermediate frequency signal, and an S-polarization state amplitude distribution matrix and an S-polarization state phase distribution matrix corresponding to the S-polarization state intermediate frequency signal, and then performing step B, where the amplitude distribution matrix represents distribution of signal amplitudes over time and distance, and the phase distribution matrix represents distribution of signal phases over time and distance;

step B: Obtaining a perturbation position of a P-polarization state according to the P-polarization state amplitude distribution matrix, obtaining a perturbation position of an S-polarization state according to the S-polarization state amplitude distribution matrix, and then performing step C;

step C: Separately dividing the P-polarization state amplitude distribution matrix and the S-polarization state amplitude distribution matrix along a timeline according to a preset time-domain window TW size to obtain signal intervals (each having a duration of TWsize) corresponding to the P-polarization state amplitude distribution matrix and signal intervals (each having a duration of TWsize) corresponding to the S-polarization state amplitude distribution matrix, and then performing step D.

step D. For each signal interval of the P-polarization state amplitude distribution matrix and the S-polarization state amplitude distribution matrix after division, calculating a first amplitude characteristic value and a position thereof within a spatial resolution width before the perturbation position in a current signal interval corresponding to the P-polarization state and a first amplitude characteristic value and a position thereof within the spatial resolution width before the perturbation position in the current signal interval corresponding to the S-polarization state; calculating a second amplitude characteristic value and a position thereof within a spatial resolution width after the perturbation position in the current signal interval corresponding to the P-polarization state and a second amplitude characteristic value and a position thereof within the spatial resolution width after the perturbation position in the current signal interval corresponding to the S-polarization state; further obtaining a first amplitude characteristic value and a second amplitude characteristic value, as well as positions corresponding to the first amplitude characteristic value and the second amplitude characteristic value within spatial resolution widths before and after the perturbation position in each signal interval corresponding to the P-polarization state, and a first amplitude characteristic value and a second amplitude characteristic value, as well as positions corresponding to the first amplitude characteristic value and the second amplitude characteristic value within spatial resolution widths before and after the perturbation position in each signal interval corresponding to the S-polarization state; and then performing step E;

step E: For each signal interval of the P-polarization state amplitude distribution matrix and the S-polarization state amplitude distribution matrix after division, based on the P-polarization state phase distribution matrix and the S-polarization state phase distribution matrix, first selecting a polarization state phase and a position thereof that correspond to a larger one of the first amplitude characteristic values within the spatial resolution width before the perturbation position in the current signal interval corresponding to the P-polarization state and the S-polarization state as a polarization state phase before the perturbation position in the current signal interval; meanwhile, selecting a polarization state phase and a position thereof that correspond to a larger one of the second amplitude characteristic values within the spatial resolution width after the perturbation position in the current signal interval corresponding to the P-polarization state and the S-polarization state as a polarization state phase after the perturbation position in the current signal interval; then calculating a phase difference between the selected polarization state phases before and after the perturbation position in the current signal interval, performing phase extraction, and obtaining a phase signal of the perturbation position in the current signal interval; further obtaining a phase signal of the perturbation position in each signal interval to reconstruct a phase signal of the perturbation position; and then performing step F; and step F: Performing phase unwrapping according to the reconstructed phase signal of the perturbation position in each signal interval to restore an optical fiber expansion condition at the perturbation position caused by an external perturbation signal, that is, obtaining a perturbation monitoring result of the FUT.

In a preferred technical solution of the present disclosure, based on the P-polarization state amplitude distribution matrix and the S-polarization state amplitude distribution matrix obtained in step A, the method further includes the following step I to step II to obtain a loss monitoring result of the FUT:

step I: Separately calculating a sum of the square of the P-polarization state amplitude distribution matrix and a sum of the square of the S-polarization state amplitude distribution matrix in a timeline order to obtain a sum-of-square result of the P-polarization state amplitude distribution matrix and a sum-of-square result of the S-polarization state amplitude distribution matrix, and then performing step II; and step II: Performing cumulative averaging on the sum-of-square result of the P-polarization state amplitude distribution matrix and the sum-of-square result of the S-polarization state amplitude distribution matrix to obtain a loss monitoring result of the FUT.

In a preferred technical solution of the present disclosure, step D includes:

separately performing step D1 to step D2 for each signal interval of the P-polarization state amplitude distribution matrix and the S-polarization state amplitude distribution matrix after division to obtain a first amplitude characteristic value and a second amplitude characteristic value, as well as positions corresponding to the first amplitude characteristic value and the second amplitude characteristic value, within spatial resolution widths before and after the perturbation position in each signal interval corresponding to the P-polarization state, and a first amplitude characteristic value and a second amplitude characteristic value, as well as positions corresponding to the first amplitude characteristic value and the second amplitude characteristic value, within spatial resolution widths before and after the perturbation position in each signal interval corresponding to the S-polarization state; and then performing step E;

step D1: Obtaining a minimum amplitude value of each spatial position within the spatial resolution width before the perturbation position in the current signal interval corresponding to the P-polarization state according to the P-polarization state amplitude distribution matrix; obtaining a minimum amplitude value of each spatial position within the spatial resolution width before the perturbation position in the current signal interval corresponding to the S-polarization state according to the S-polarization state amplitude distribution matrix; selecting a maximum amplitude value among all the minimum amplitude values corresponding to the P-polarization state as the first amplitude characteristic value before the perturbation position in the current signal interval corresponding to the P-polarization state, which is denoted by $A^P_{ra}$; and selecting a maximum amplitude value among all the minimum amplitude values corresponding to the S-polarization state as the first amplitude characteristic value before the perturbation position in the current signal interval corresponding to the S-polarization state, which is denoted by $A^s_{ra}$, where the subscript ra represents the position of the first amplitude characteristic value before the perturbation position in the signal interval corresponding to the P-polarization state or the S-polarization state; and step D2: Obtaining a minimum amplitude value of each spatial position within the spatial resolution width after the perturbation position in the current signal interval corresponding to the S-polarization state according to the S-polarization state amplitude distribution matrix; obtaining a minimum amplitude value of each spatial position within the spatial resolution width after the perturbation position in the current signal interval corresponding to the S-polarization state according to the S-polarization state amplitude distribution matrix; selecting a maximum amplitude value among all the minimum amplitude values corresponding to the P-polarization state as the second amplitude characteristic value after the perturbation position in the current signal interval corresponding to the P-polarization state; which is denoted by APro, and selecting a maximum amplitude value among all the minimum amplitude values corresponding to the S-polarization state as the second amplitude characteristic value after the perturbation position in the current signal interval corresponding to the S-polarization state, which is denoted by ASrb, where the subscript rb represents the position of the second amplitude characteristic value after the perturbation position in the signal interval corresponding to the P-polarization state or the S-polarization state.

In a preferred technical solution of the present disclosure, options of polarization state phases before and after the perturbation position in each signal interval in step E include:

(1) a P-polarization state phase is selected before the perturbation position in the signal interval, and a P-polarization state phase is selected after the perturbation position;

(2) a P-polarization state phase is selected before the perturbation position in the signal interval, and an S-polarization state phase is selected after the perturbation position;

(3) an S-polarization state phase is selected before the perturbation position in the signal interval, and a P-polarization state phase is selected after the perturbation position; and (4) an S-polarization state phase is selected before the perturbation position in the signal interval, and an S-polarization state phase is selected after the perturbation position.

The present disclosure provides a method for suppressing coherent and polarization-induced fading by simultaneous monitoring of loss and vibration. Compared with the prior art, the foregoing technical solution has the following technical effects:

The present disclosure designs a method for suppressing coherent and polarization-induced fading by simultaneous monitoring of loss and vibration. By using merely common single-mode sensing fibers, the polarization diversity-based measurement method solves the conflict between Φ-OTDR and COTDR in terms of polarization state. In addition, the present disclosure not only achieves a better coherent fading noise suppression effect but also enhances the capability of recognizing small loss events in the monitoring of loss parameters. Meanwhile, the present disclosure can suppress the influence of coherent fading on the phase demodulation of Φ-OTDR and reconstruct a vibration signal with high fidelity in the monitoring of perturbation parameters, which can effectively reduce the error rate of external perturbation warning.

Figure 1:
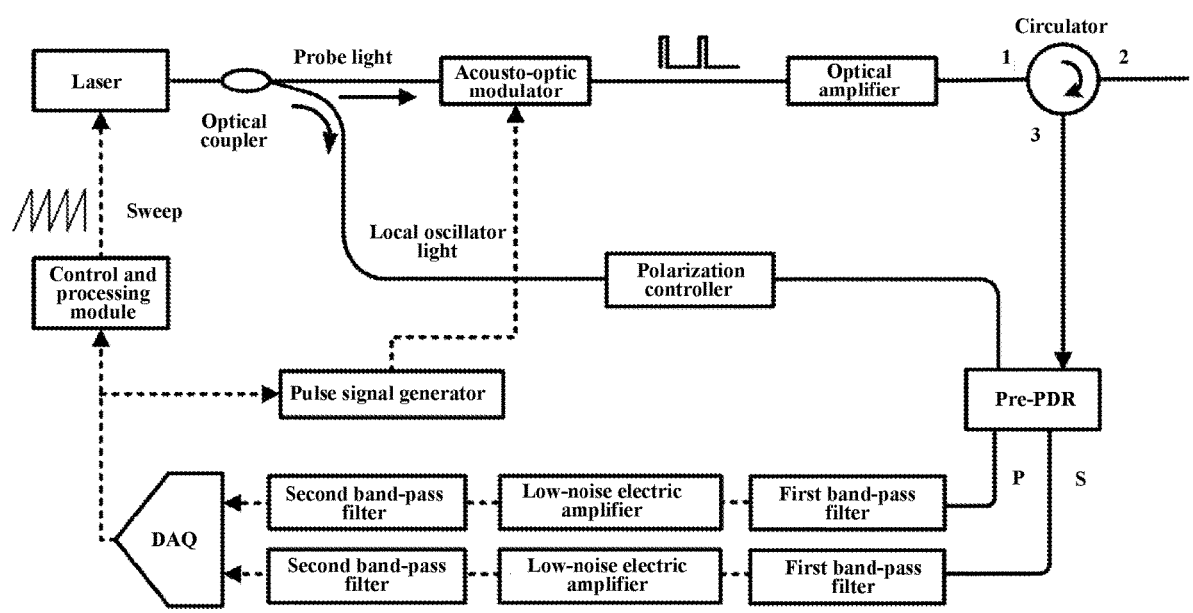
FIG. 1 is a schematic diagram of a system architecture of a method for suppressing coherent and polarization-induced fading by simultaneous monitoring of loss and vibration according to the present disclosure.

In the drawings: 1. FUT 1; 2. FUT 2; 3. cylindrical columnar PZT for experiments.

DETAILED DESCRIPTION OF THE EMBODIMENTS

The specific implementation of the present disclosure will be further described in detail below with reference to the drawings.

The present disclosure designs a method for suppressing coherent and polarization-induced fading by simultaneous monitoring of loss and vibration. The method is executed based on a specifically designed system architecture. In practical application design, as shown in FIG. 1, the system specifically includes a laser, an optical coupler, an acousto-optic modulator, an optical amplifier, a circulator, a pre-polarization diversity receiver (Pre-PDR), a polarization controller, a control and processing module, a data acquisition board (DAQ), a pulse signal generator, a P-polarization state signal filter device, and an S-polarization state signal filter device.

The laser is connected to the control and processing module. The laser performs sweeping based on a preset sweep speed from the control and processing module and generates a continuous optical signal. An optical output terminal of the laser is connected to an input terminal of the optical coupler. The optical coupler performs beam splitting on the received continuous optical signal to obtain an optical probe signal and an OLO signal. An OLO signal output terminal of the optical coupler is connected to an input terminal of the polarization controller. The polarization controller adjusts a polarization state of the received OLO signal. An optical probe signal output terminal of the optical coupler is connected to an input terminal of the acousto-optic modulator. Under the control of a pulse modulation signal outputted by the pulse signal generator, the acousto-optic modulator modulates the received optical probe signal to obtain a probe light pulse and performs frequency shifting.

An output terminal of the acousto-optic modulator is connected to an input terminal of the optical amplifier. The acousto-optic modulator transmits the probe light pulse to the optical amplifier for amplification. An output terminal of the optical amplifier is connected to the circulator, and the optical amplifier transmits the probe light pulse to the circulator. The circulator transmits the probe light pulse to the FUT and receives an RBS signal returned by the FUT. The pre-PDR is connected to the circulator and the polarization controller. The pre-PDR receives the RBS signal from the circulator and the OLO signal from the polarization controller to implement coherent processing of each polarization state in the RBS signal with the OLO signal, thereby obtaining and outputting a P-polarization state intermediate frequency signal and an S-polarization state intermediate frequency signal.

The P-polarization state signal filter device and the S-polarization state signal filter device have the same structure and perform filtering, amplification, and secondary filtering on the P-polarization state intermediate frequency signal and the S-polarization state intermediate frequency signal from an output terminal of the pre-PDR to update and output the polarization state intermediate frequency signals.

An output terminal of the P-polarization state signal filter device and an output terminal of the S-polarization state signal filter device are connected to two input terminals of the DAQ. The DAQ acquires the updated polarization state intermediate frequency signals from the two polarization state signal filter devices and transmits the acquired signals to the control and processing module for data processing, where the method for suppressing coherent and polarization-induced fading by simultaneous monitoring of loss and vibration is performed. Based on clock signals synchronous with the polarization state intermediate frequency signals outputted by the DAQ, the pulse signal generator generates a pulse modulation signal for driving the acousto-optic modulator to generate probe pulse light and outputs the pulse modulation signal to the acousto-optic modulator.

In the practical design application, the two polarization state signal filter devices in the system each include a first band-pass filter, a low-noise electric amplifier, and a second band-pass filter. In the structures of the two polarization state signal filter devices, an input terminal of the first band-pass filter forms an input terminal of the polarization state signal filter device; an output terminal of the first band-pass filter is connected to an input terminal of the low-noise electric amplifier; an output terminal of the low-noise electric amplifier is connected to an input terminal of the second band-pass filter; and an output terminal of the second band-pass filter forms an output terminal of the corresponding polarization state signal filter device. The first band-pass filter is configured to remove useless signals and broadband noise in the polarization state intermediate frequency signal by filtration and perform first-stage filtering processing to update the polarization state intermediate frequency signal. The low-noise electric amplifier is configured to amplify and update the polarization state intermediate frequency signal outputted by the first band-pass filter. The second band-pass filter is configured to remove by filtration useless signals and broadband noise in the polarization state intermediate frequency signal outputted by the corresponding low-noise electric amplifier and performs second-stage filtering processing to update and output the polarization state intermediate frequency signal.

Moreover, in the practical system building, the optical amplifier is specifically an erbium-doped optical fiber amplifier, and the laser is specifically a narrow linewidth tunable laser.

Figure 3:
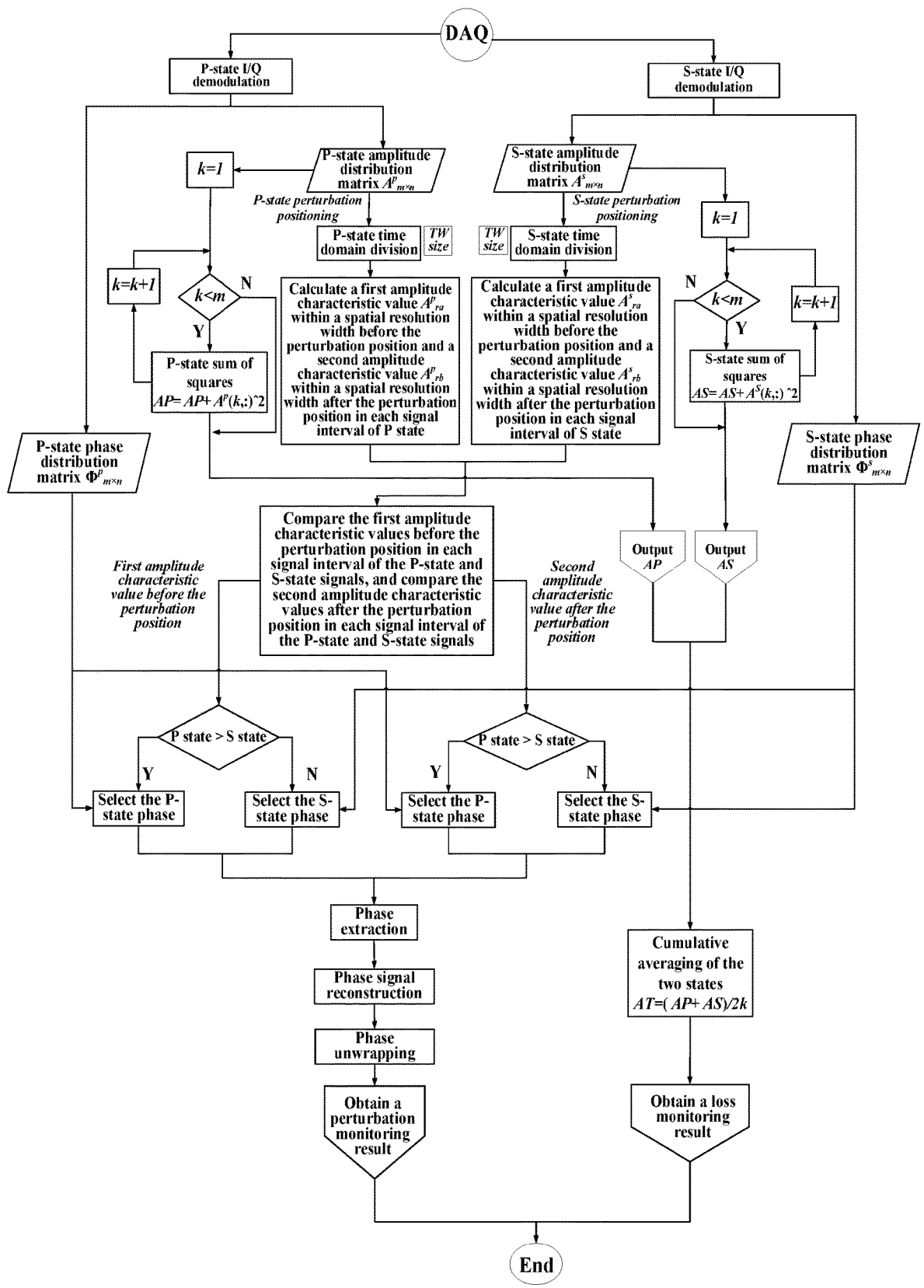
FIG. 3 is a flowchart of a method for suppressing coherent and polarization-induced fading by simultaneous monitoring of loss and vibration according to the present disclosure.

The system built based on the foregoing practical application specifically executes the method for suppressing coherent and polarization-induced fading by simultaneous monitoring of loss and vibration designed in the present disclosure. Based on two orthogonal polarization state intermediate frequency signals obtained through polarization diversity detection for an FUT, in the practical application, as shown in FIG. 3, the following step A to step F are specifically performed.

Step A: Separately perform IQ demodulation on a P-polarization state intermediate frequency signal and an S-polarization state intermediate frequency signal in the two orthogonal polarization state intermediate frequency signals to obtain a P-polarization state amplitude distribution matrix and a P-polarization state phase distribution matrix corresponding to the P-polarization state intermediate frequency signal and an S-polarization state amplitude distribution matrix and an S-polarization state phase distribution matrix corresponding to the S-polarization state intermediate frequency signal, and then perform step B, where the amplitude distribution matrix represents distribution of signal amplitudes over time and distance, and the phase distribution matrix represents distribution of signal phases over time and distance.

Step B: Obtain a perturbation position of a P-polarization state according to the P-polarization state amplitude distribution matrix, obtain a perturbation position of an S-polarization state according to the S-polarization state amplitude distribution matrix, and then perform step C.

Step C: Separately divide the P-polarization state amplitude distribution matrix and the S-polarization state amplitude distribution matrix along a timeline according to a preset time-domain window TW size to obtain signal intervals (each having a duration of TWsize) corresponding to the P-polarization state amplitude distribution matrix, and signal intervals (each having a duration of TWsize) corresponding to the S-polarization state amplitude distribution matrix, and then perform step D.

Step D. For each signal interval of the P-polarization state amplitude distribution matrix and the S-polarization state amplitude distribution matrix after division, calculate a first amplitude characteristic value and a position thereof within a spatial resolution width before the perturbation position in a current signal interval corresponding to the P-polarization state and a first amplitude characteristic value and a position thereof within the spatial resolution width before the perturbation position in the current signal interval corresponding to the S-polarization state; calculate a second amplitude characteristic value and a position thereof within a spatial resolution width after the perturbation position in the current signal interval corresponding to the P-polarization state, and a second amplitude characteristic value and a position thereof within the spatial resolution width after the perturbation position in the current signal interval corresponding to the S-polarization state; further obtain a first amplitude characteristic value and a second amplitude characteristic value, as well as positions corresponding to the first amplitude characteristic value and the second amplitude characteristic value, within spatial resolution widths before and after the perturbation position in each signal interval corresponding to the P-polarization state, and a first amplitude characteristic value and a second amplitude characteristic value, as well as positions corresponding to the first amplitude characteristic value and the second amplitude characteristic value within spatial resolution widths before and after the perturbation position in each signal interval corresponding to the S-polarization state; and then perform step E.

In a practical application, for the specific design of step D, step D1 to step D2 are separately performed for each signal interval of the P-polarization state amplitude distribution matrix and the S-polarization state amplitude distribution matrix after division to obtain a first amplitude characteristic value and a second amplitude characteristic value, as well as positions corresponding to the first amplitude characteristic value and the second amplitude characteristic value, within spatial resolution widths before and after the perturbation position in each signal interval corresponding to the P-polarization state, and a first amplitude characteristic value and a second amplitude characteristic value, as well as positions corresponding to the first amplitude characteristic value and the second amplitude characteristic value within spatial resolution widths before and after the perturbation position in each signal interval corresponding to the S-polarization state; and then performing step E.

Step D1: Obtain a minimum amplitude value of each spatial position within the spatial resolution width before the perturbation position in the current signal interval corresponding to the P-polarization state according to the P-polarization state amplitude distribution matrix, obtain a minimum amplitude value of each spatial position within the spatial resolution width before the perturbation position in the current signal interval corresponding to the S-polarization state according to the S-polarization state amplitude distribution matrix, select a maximum amplitude value among all the minimum amplitude values corresponding to the P-polarization state as the first amplitude characteristic value before the perturbation position in the current signal interval corresponding to the P-polarization state, which is denoted by $A^P_{ra}$, and select a maximum amplitude value among all the minimum amplitude values corresponding to the S-polarization state as the first amplitude characteristic value before the perturbation position in the current signal interval corresponding to the S-polarization state, which is denoted by $A^s_{ra}$, where the subscript ra represents the position of the first amplitude characteristic value before the perturbation position in the signal interval corresponding to the P-polarization state or the S-polarization state.

Step D2: Obtain a minimum amplitude value of each spatial position within the spatial resolution width after the perturbation position in the current signal interval corresponding to the P-polarization state according to the P-polarization state amplitude distribution matrix, obtain a minimum amplitude value of each spatial position within the spatial resolution width after the perturbation position in the current signal interval corresponding to the S-polarization state according to the S-polarization state amplitude distribution matrix, select a maximum amplitude value among all the minimum amplitude values corresponding to the P-polarization state as the second amplitude characteristic value after the perturbation position in the current signal interval corresponding to the P-polarization state, which is denoted by $A^P_{rb}$, and select a maximum amplitude value among all the minimum amplitude values corresponding to the S-polarization state as the second amplitude characteristic value after the perturbation position in the current signal interval corresponding to the S-polarization state, which is denoted by $A^s_{rb}$, where the subscript rb represents the position of the second amplitude characteristic value after the perturbation position in the signal interval corresponding to the P-polarization state or the S-polarization state.

Step E: For each signal interval of the P-polarization state amplitude distribution matrix and the S-polarization state amplitude distribution matrix after division, based on the P-polarization state phase distribution matrix and the S-polarization state phase distribution matrix, first select a polarization state phase and a position thereof that correspond to a larger one of the first amplitude characteristic values (max $\{A^P_{ra}, A^s_{ra}\}$) within the spatial resolution width before the perturbation position in the current signal interval corresponding to the P-polarization state and the S-polarization state as a polarization state phase before the perturbation position in the current signal interval; meanwhile, select a polarization state phase and a position thereof that correspond to a larger one of the second amplitude characteristic values (max $\{A^P_{rb}, A^s_{rb}\}$) within the spatial resolution width after the perturbation position in the current signal interval corresponding to the P-polarization state and the S-polarization state as a polarization state phase after the perturbation position in the current signal interval; then calculate a phase difference between the selected polarization state phases before and after the perturbation position in the current signal interval, perform phase extraction, and obtain a phase signal of the perturbation position in the current signal interval; further obtain a phase signal of the perturbation position in each signal interval to reconstruct a phase signal of the perturbation position; and then perform step F.

In the practical application, options of polarization state phases before and after the perturbation position in each signal interval in step E include:

(1) a P-polarization state phase is selected before the perturbation position in the signal interval, and a P-polarization state phase is selected after the perturbation position;

(2) a P-polarization state phase is selected before the perturbation position in the signal interval, and an S-polarization state phase is selected after the perturbation position;

(3) an S-polarization state phase is selected before the perturbation position in the signal interval, and a P-polarization state phase is selected after the perturbation position; and (4) an S-polarization state phase is selected before the perturbation position in the signal interval, and an S-polarization state phase is selected after the perturbation position.

The present disclosure provides multiple options for suppressing coherent and polarization-introduced fading, thereby achieving a better coherent and polarization-introduced fading suppression effect.

Step F: Perform phase unwrapping according to the reconstructed phase signal of the perturbation position in each signal interval to restore an optical fiber expansion condition at the perturbation position caused by an external perturbation signal, that is, obtain a perturbation monitoring result of the FUT.

In the practical application, based on the P-polarization state amplitude distribution matrix and the S-polarization state amplitude distribution matrix obtained in step A, the method further includes the following step I to step II to obtain a loss monitoring result of the FUT:

Step I: Separately calculate a sum of the square of the P-polarization state amplitude distribution matrix and a sum of the square of the S-polarization state amplitude distribution matrix in a timeline order to obtain a sum-of-square result of the P-polarization state amplitude distribution matrix and a sum-of-square result of the S-polarization state amplitude distribution matrix, and then performing step II.

Step II: Perform cumulative averaging on the sum-of-square result of the P-polarization state amplitude distribution matrix and the sum-of-square result of the S-polarization state amplitude distribution matrix to obtain a loss monitoring result of the FUT.

The method for suppressing coherent and polarization-induced fading by simultaneous monitoring of loss and vibration designed in the present disclosure is put into practice. Using long-distance submarine cable monitoring as an example, the technical solution in the present disclosure is described in further detail with reference to the accompanying drawings.

As shown in FIG. 1, the system uses a narrow linewidth tunable NKT laser having a wavelength of 1550.12 nm and a linewidth of 3.7 kHz as a light source, and the light frequency of the light source is tuned by a programmable drive controlled by a control and processing module. Continuous light outputted by the NKT laser is divided by an optical coupler with a ratio of 90:10, where 90% of the light is used as probe light, and 10% of the light is used as local oscillator light. The probe light is modulated into a light pulse with a frequency shift of 200 MHz by an acousto-optic modulator, and then optical amplifier performs power amplification on the light pulse. A spatial resolution within 100 m is sufficient to meet the requirement of maritime location of long-distance submarine cable monitoring. Therefore, the modulated pulse of the acousto-optic modulator in the experiment has a pulse width of 1 us and a cycle of 1 ms. In order to ensure the measurement accuracy of Φ-OTDR for the external perturbation and suppress the amplitude fluctuation of RBS curves, a sweep speed of 5 MHz/s is selected in the experiment according to the requirement of Φ-OTDR for the correlation of adjacent RBS curves and the relationship between the sweep speed and the pulse width and cycle of the modulated signal. This is sufficient to effectively suppress the impact of coherent fading on the loss measurement accuracy without sacrificing the perturbation event recognition capability of Φ-OTDR. The probe pulse light amplified by the optical amplifier is injected into the FUTs through port 2 of the circulator.

Figure 2:
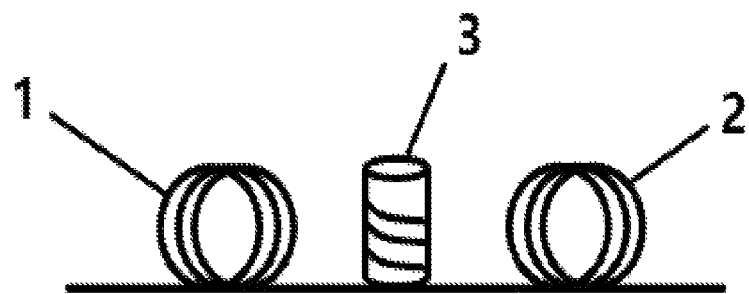
FIG. 2 is a schematic diagram of connection between optical fibers to be tested according to the present disclosure.

As shown in FIG. 2, the FUT 1 and the FUT 2 are a single-mode fiber with a length of 71 km and a single-mode fiber with a length of 1 km, respectively. An optical fiber with a length of about 30 m is wound on the surface of the cylindrical columnar PZT for experiments to simulate vibration that generates an external sound field. In the experiment, a 30 Hz sine wave is applied to the PZT to simulate perturbation of the sensing fiber caused by the external acoustic field.

RBS light generated in the optical fiber is returned through port 2 of the circulator and is outputted through port 3. The RBS light and the local oscillator are received by a pre-PDR, where the polarization state of the local oscillator is adjusted by the polarization controller to balance the strengths of P-state and S-state intermediate frequency signals outputted by the pre-PDR, such that average strengths of the two signals are consistent as much as possible. The coherent beat frequency generates a P-state intermediate frequency signal and an S-state intermediate frequency signal. Each signal is further filtered by a band-pass filter having a central frequency of 200 MHz and amplified by a low-noise amplifier. Finally, the signals are acquired by a DAQ and transmitted to the control and processing module for data processing. A sampling rate of the system is 1.25 GSa/s. A first band-pass filter and a second band-pass filter each have a bandwidth band-pass range of 195 MHz to 205 MHz, and a gain of the low-noise amplifier is 27 dB. The polarization state signal filter device is mainly used for removing useless signals by filtration and amplifying the weak electrical signal generated by photoelectric conversion.

Data processing after the acquisition is as shown in FIG. 3, where the specific process is as follows:

(1) IQ demodulation is separately performed on the acquired two intermediate frequency signals (P state and S state) to obtain amplitude distribution matrices $A^p_{m \times n}$ and $A^s_{m \times n}$ and phase distribution matrices $\Phi^p_{m \times n}$ and $\Phi^s_{m \times n}$ of the P-state and M-state intermediate frequency signals, where A and Φ are both m×n matrices consisting of time rows and distance columns. In the two matrices, each row represents distribution of amplitudes and phases over distance, and each column represents variations of amplitude and phase over time.

Figure 4:
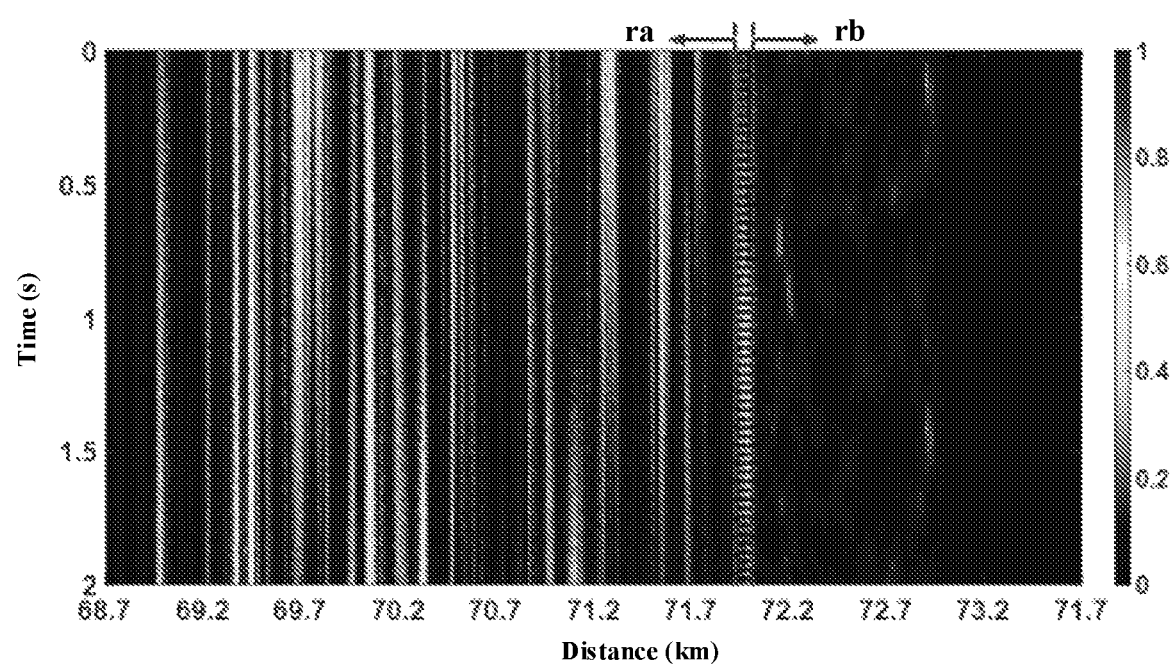
FIG. 4 is a waterfall chart of amplitude within 2 s near piezo-electric transducers (PZT) in P state according to an embodiment.

(2) A P-polarization state perturbation position and an S-polarization state perturbation position are obtained according to the P-state amplitude distribution matrix and the S-state amplitude distribution matrix. FIG. 4 is a waterfall chart of amplitude within 2 s near PZT in P state, and it can be clearly seen from the dashed line area in the figure that a periodic signal is detected at 71.9 km.

(3) Time-domain division is separately performed on the P-state amplitude distribution matrix and the S-state amplitude distribution matrix based on a time-domain window TWsize along the timeline. Considering the low frequency characteristics of the submarine perturbation event, the time-domain window TWsize is set to 20 points, that is, 0.02s. The P-state and S-state amplitude distribution matrices are each divided into equal-width 428 signal intervals connected end to end.

(4) Along the timeline of the 428 divided signal intervals, first amplitude characteristic values before the perturbation position in the current time-domain width TWsize of the P-state and S-state amplitude distribution matrices are compared with each other, and second amplitude characteristic values after the perturbation position in the current time-domain width TWsize of the P-state and S-state amplitude distribution matrices are compared with each other; a polarization state phase and a position thereof ra that correspond to a larger one of the first amplitude characteristic values (max $\{A^p_{ra}, A^s_{ra}\}$) in the spatial resolution width before the perturbation position in the current signal interval of the two states is selected as a polarization state phase before the perturbation position. Meanwhile, a polarization state phase and a position thereof rb that correspond to a larger one of the second amplitude characteristic values (max $\{A^p_{rb}, A^s_{rb}\}$) in the spatial resolution width after the perturbation position in the current signal interval of the two states is selected as a polarization state phase after the perturbation position. A phase difference between the selected polarization state phases before and after the perturbation position in the current signal interval is calculated, and phase extraction is performed to obtain a phase signal of the perturbation position in the current signal interval. Further, phase signals of the perturbation position in the 428 signal intervals are obtained to reconstruct a phase signal of the perturbation position.

(5) The reconstructed phase signal is unwrapped to restore an optical fiber expansion condition at the perturbation position caused by an external perturbation signal and to obtain a perturbation monitoring result, thereby implementing sensing of the external perturbation signal.

(6) The P-state and S-state amplitude matrices $A^p_{m \times n}$ and $A^s_{m \times n}$ are squared along the timeline to obtain a sum of squares AP and a sum of squares AS of the P-state and S-state amplitude matrices.

Figure 5A:
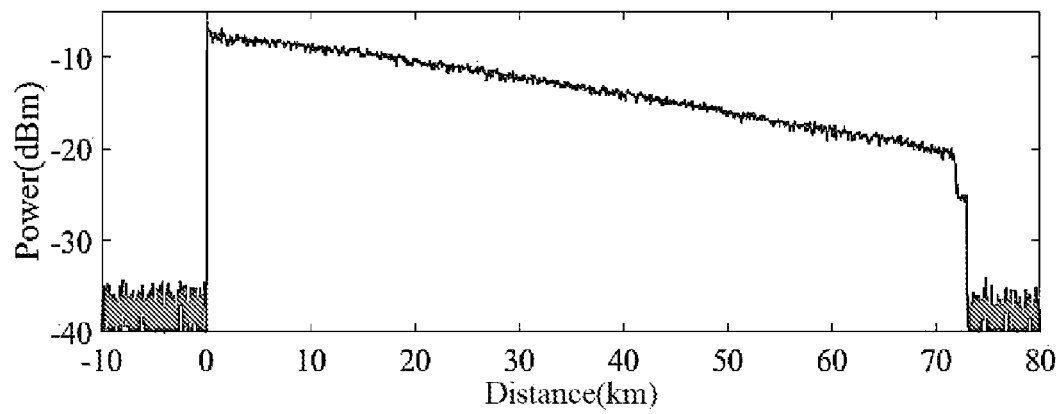
FIGS. 5A-5C show loss test results of $2^{16}$ curves according to an embodiment.
Figure 5B:
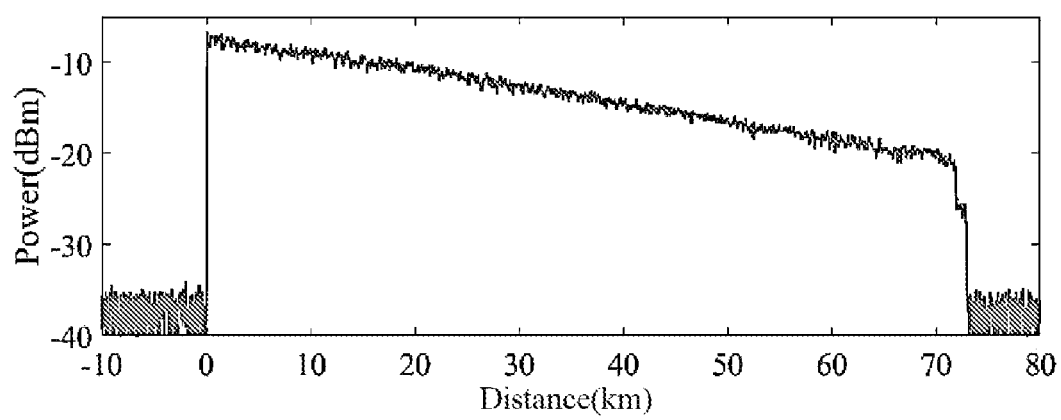
Figure 5C:
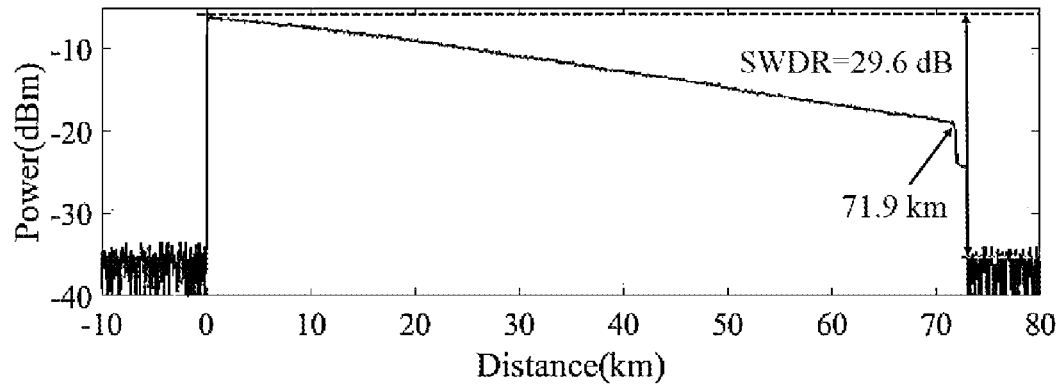
Figure 6:
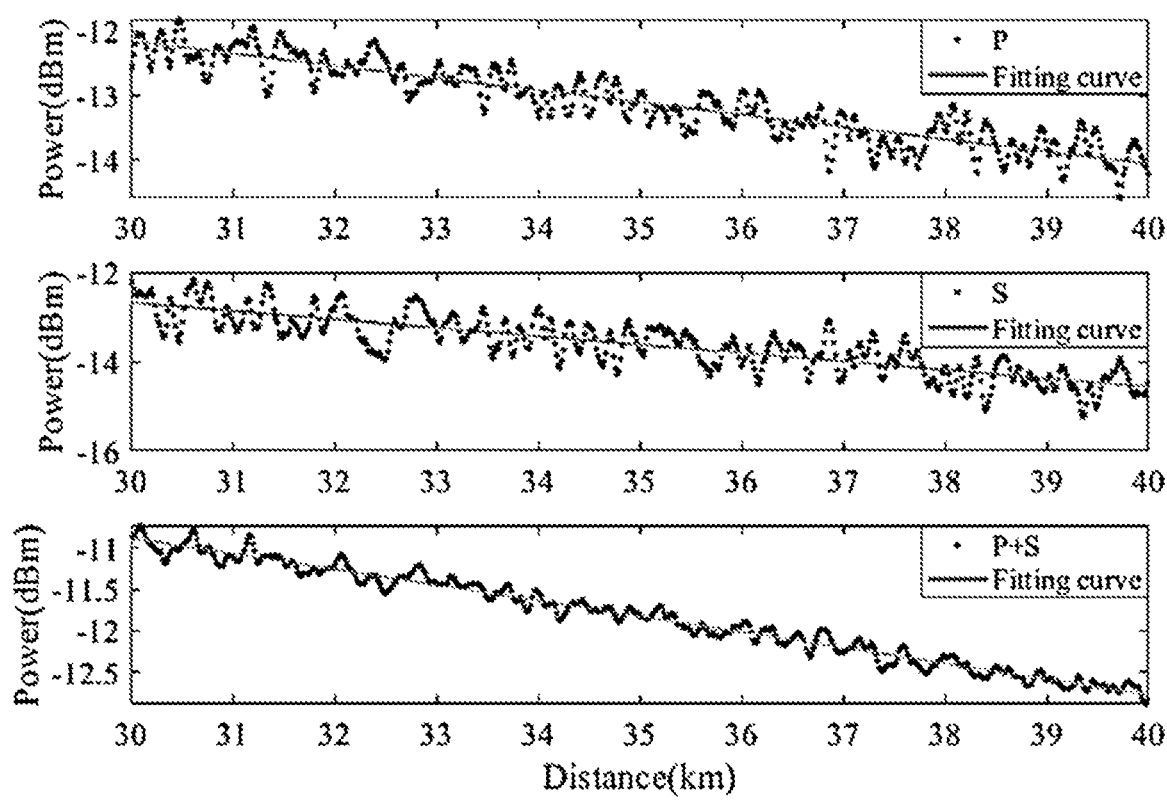
FIG. 6 is a partial enlarged diagram of the loss test results according to an embodiment.

(7) Cumulative averaging is further performed on the P-state and S-state sum-of-square matrices AP and AS to obtain curve AT, thereby obtaining a loss monitoring result, as shown in FIGS. 5A-5C. FIG. 5A is an averaging result of $2^{16}$ RBS curves of the P-polarization state, and FIG. 5B is an averaging result of $2^{16}$ RBS curves of the S-polarization state; and FIG. 5C is an improved averaging result of total RBS curves of the two states. It can be seen that, after the RBS curves of the two states are further averaged, the obtained COTDR curve is smoother, and a total dynamic range of 59.2 dB is obtained, where the corresponding single-way dynamic range (SWDR) is 29.6 dB. FIG. 6 is a partial enlarged diagram of a range of 30 km to 40 km in FIGS. 5A-5C. Upon calculation, the fluctuations of the COTDR curves obtained in P state and S state are 0.24 dB and 0.35 dB, respectively, and the fluctuation of the COTDR curve obtained after cumulative averaging of the two states is 0.09 B. It can be seen that, the method for suppressing coherent and polarization-induced fading by simultaneous monitoring of loss and vibration provided by the present disclosure not only can achieve a better effect of suppressing coherent fading noise but also can enhance the capability of recognizing small loss events.

Figure 7A:
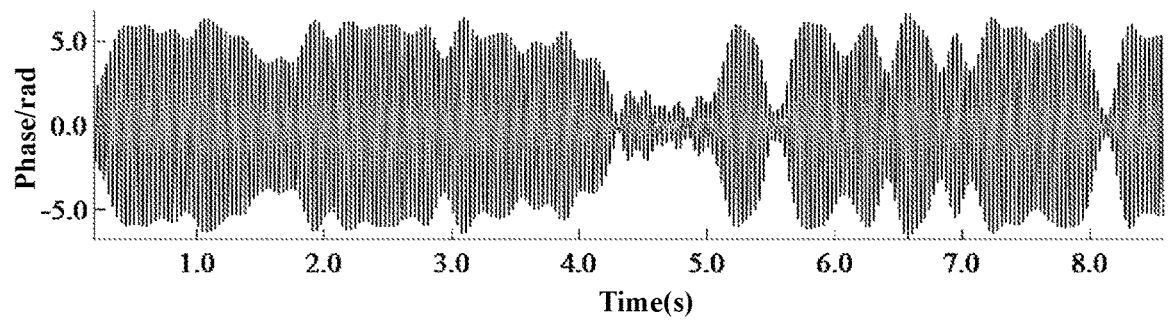
FIGS. 7A-7E show phase information extracted in two states and a reconstruction result after optimization.
Figure 7B:
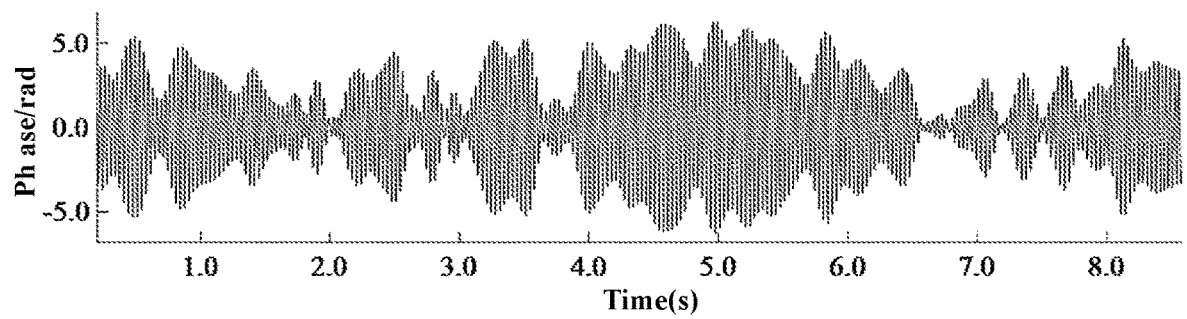
Figure 7C:
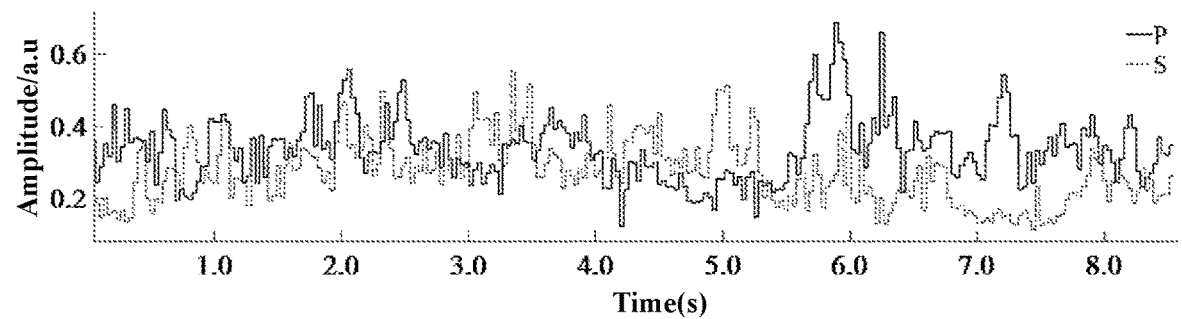
Figure 7D:
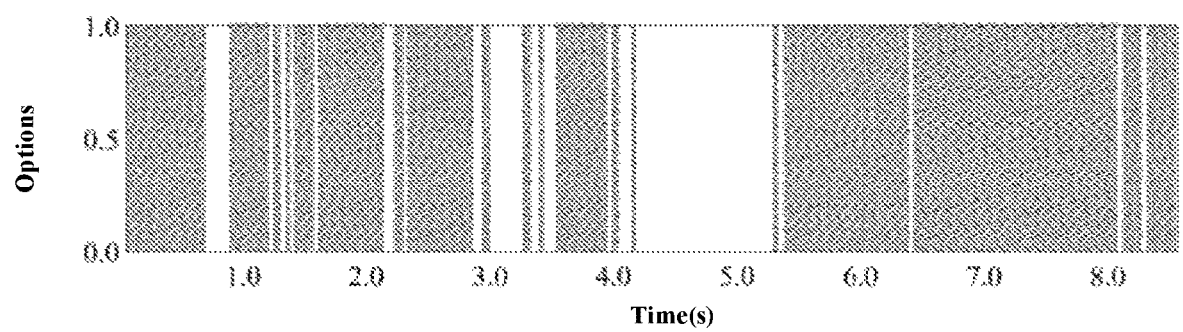
Figure 7E:
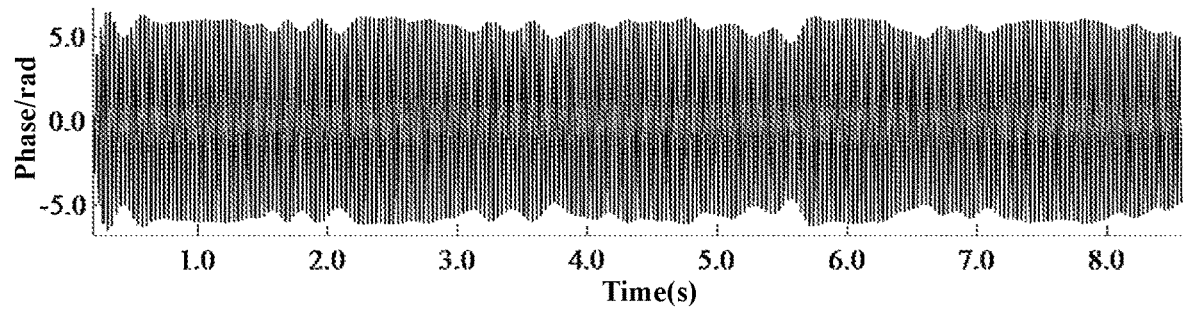

FIGS. 7A-7E show phase extraction results before and after the optimization of the method provided by the present disclosure. To highlight the amplitude optimization effect of the polarization diversity, with a known signal frequency applied, band-pass filtering is performed on the phase-discriminative results. From top to bottom, FIG. 7A and FIG. 7B are waveforms of RBS reconstructed vibration signals of the P state and S state, respectively. It can be seen that, before the optimization algorithm of the present disclosure is performed, phase signals extracted from the P-state RBS and S-state RBS both have multiple distortions. FIG. 7C shows a total amplitude, at position ra and position rb in the TWsize time domain, of the amplitudes obtained by demodulating the S-state and P-state RBS signals. Compared with the corresponding signal strength, the distortion positions in FIG. 7A and FIG. 7B are both positions with relatively small amplitude values. FIG. 7D corresponds to the amplitude value selection strategy in FIG. 7C, where phase extraction is performed on the one with a maximum total amplitude characteristic value within the current time-domain window. The blue area represents that P state is selected, and the red area represents that S state is selected. It can be seen from the figure that, as time passes by, the phase extraction is constantly switched between the two polarization states, thereby obtaining the waveform of the reconstructed phase signal as shown in FIG. 7E.

As can be seen, the method for suppressing coherent and polarization-induced fading by simultaneous monitoring of loss and vibration provided by the present disclosure can reconstruct the phase signal with high fidelity and simultaneously implement loss and vibration monitoring within a single-way sensing distance of at least 71.9 km.

Although the embodiments of the present disclosure are described in detail above in conjunction with the drawings, the present disclosure is not limited to the above-described embodiments, and various changes may be made without departing from the spirit of the present disclosure within the knowledge of those skilled in the art.

What is claimed is:

1. A method for suppressing a coherent and polarization-induced fading by a simultaneous monitoring of loss and vibration, comprising step A to step F based on two orthogonal polarization state intermediate frequency signals obtained through a polarization diversity detection for a fiber under test (FUT):

step A: performing separately an IQ demodulation on a P-polarization state intermediate frequency signal and an S-polarization state intermediate frequency signal in the two orthogonal polarization state intermediate frequency signals, to obtain a P-polarization state amplitude distribution matrix corresponding to the P-polarization state intermediate frequency signal and a P-polarization state phase distribution matrix corresponding to the P-polarization state intermediate frequency signal, and an S-polarization state amplitude distribution matrix corresponding to the S-polarization state intermediate frequency signal and an S-polarization state phase distribution matrix corresponding to the S-polarization state intermediate frequency signal, and performing step B, wherein each of the P-polarization state amplitude distribution matrix and the S-polarization state amplitude distribution matrix represents a distribution of signal amplitudes over time and distance, and each of the P-polarization state phase distribution matrix and the S-polarization state phase distribution matrix represents a distribution of signal phases over the time and distance;

step B: obtaining a perturbation position of a P-polarization state according to the P-polarization state amplitude distribution matrix, obtaining a perturbation position of an S-polarization state according to the S-polarization state amplitude distribution matrix, and performing step C;

step C: dividing separately the P-polarization state amplitude distribution matrix and the S-polarization state amplitude distribution matrix along a timeline according to a preset time-domain window $TW_{size}$, to obtain signal intervals (each having a duration of $TW_{size}$) corresponding to the P-polarization state amplitude distribution matrix, and signal intervals (each having the duration of $TW_{size}$) corresponding to the S-polarization state amplitude distribution matrix, and performing step D;

step D: calculating for each of the signal intervals of the P-polarization state amplitude distribution matrix and each of the signal intervals of the S-polarization state amplitude distribution matrix after a division, a first amplitude characteristic value and a position of the first amplitude characteristic value within a first spatial resolution width before the perturbation position in a current signal interval corresponding to the P-polarization state, and calculating a first amplitude characteristic value and a position thereof the first amplitude characteristic value within the first spatial resolution width before the perturbation position in a current signal interval corresponding to the S-polarization state; calculating a second amplitude characteristic value and a position thereof the second amplitude characteristic value within a second spatial resolution width after the perturbation position in the current signal interval corresponding to the P-polarization state, and calculating a second amplitude characteristic value and a position thereof the second amplitude characteristic value within the second spatial resolution width after the perturbation position in the current signal interval corresponding to the S-polarization state; obtaining a first amplitude characteristic value, a second amplitude characteristic value, the position corresponding to the first amplitude characteristic value and the position corresponding to the second amplitude characteristic value within the first and second spatial resolution widths before and after the perturbation position in each of the signal intervals corresponding to the P-polarization state, and obtaining a first amplitude characteristic value, a second amplitude characteristic value, the position corresponding to the first amplitude characteristic value and the position corresponding to the second amplitude characteristic value within the first and second spatial resolution widths before and after the perturbation position in each of the signal intervals corresponding to the S-polarization state; and performing step E;

step E: selecting for each of the signal intervals of the P-polarization state amplitude distribution matrix and each of the signal intervals of the S-polarization state amplitude distribution matrix after the division, based on the P-polarization state phase distribution matrix and the S-polarization state phase distribution matrix, a polarization state phase and a position of the polarization state phase as a first polarization state phase before the perturbation position in the current signal interval, wherein the polarization state phase and the position of the polarization state phase correspond to a larger one of the first amplitude characteristic values within the first spatial resolution width before the perturbation position in the current signal interval corresponding to the P-polarization state and the current signal interval corresponding to the S-polarization state selecting a polarization state phase and a position of the polarization state phase as a second polarization state phase after the perturbation position in the current signal interval, wherein the polarization state phase and the position of the polarization state phase correspond to a larger one of the second amplitude characteristic values within the second spatial resolution width after the perturbation position in the current signal interval corresponding to the P-polarization state and the current signal interval corresponding to the S-polarization state; calculating a phase difference between the first and second polarization state phases before and after the perturbation position in the current signal interval, performing a phase extraction, and obtaining a phase signal of the perturbation position in the current signal interval; obtaining a phase signal of the perturbation position in each of the signal intervals, to reconstruct a phase signal of the perturbation position to obtain a reconstructed phase signal of the perturbation position; and performing step F; and step F: performing a phase unwrapping according to the reconstructed phase signal of the perturbation position in each of the signal intervals to restore an optical fiber expansion condition at the perturbation position caused by an external perturbation signal, wherein a perturbation monitoring result of the FUT is obtained.

2. The method according to claim 1, wherein based on the P-polarization state amplitude distribution matrix and the S-polarization state amplitude distribution matrix obtained in step A, the method comprises the following step I to step II, to obtain a loss monitoring result of the FUT, wherein step I: calculating separately, in a timeline order, a sum of square of the P-polarization state amplitude distribution matrix and a sum of square of the S-polarization state amplitude distribution matrix, to obtain a sum-of-square result of the P-polarization state amplitude distribution matrix and a sum-of-square result of the S-polarization state amplitude distribution matrix, and performing step II;

and step II: performing a cumulative averaging on the sum-of-square result of the P-polarization state amplitude distribution matrix and the sum-of-square result of the S-polarization state amplitude distribution matrix, to obtain the loss monitoring result of the FUT.

3. The method according to claim 1, wherein step D comprises:

performing separately step D1 to step D2 for each of the signal intervals of the P-polarization state amplitude distribution matrix and each of the signal intervals of the S-polarization state amplitude distribution matrix after the division, to obtain the first amplitude characteristic value, the second amplitude characteristic value, the position corresponding to the first amplitude characteristic value and the position corresponding to the second amplitude characteristic value within the first and second spatial resolution widths before and after the perturbation position in each of the signal intervals corresponding to the P-polarization state, and to obtain the first amplitude characteristic value, the second amplitude characteristic value, the position corresponding to the first amplitude characteristic value and the position corresponding to the second amplitude characteristic value within the first and second spatial resolution widths before and after the perturbation position in each of the signal intervals corresponding to the S-polarization state; and performing step E;

step D1: obtaining a first minimum amplitude value of each spatial position within the first spatial resolution width before the perturbation position in the current signal interval corresponding to the P-polarization state according to the P-polarization state amplitude distribution matrix, obtaining a first minimum amplitude value of each spatial position within the first spatial resolution width before the perturbation position in the current signal interval corresponding to the S-polarization state according to the S-polarization state amplitude distribution matrix, selecting a maximum amplitude value among all the first minimum amplitude values corresponding to the P-polarization state as the first amplitude characteristic value before the perturbation position in the current signal interval corresponding to the P-polarization state, wherein the first amplitude characteristic value before the perturbation position in the current signal interval corresponding to the P-polarization state is denoted by $A^P_{ra}$, and selecting a maximum amplitude value among all the first minimum amplitude values corresponding to the S-polarization state as the first amplitude characteristic value before the perturbation position in the current signal interval corresponding to the S-polarization state, wherein the first amplitude characteristic value before the perturbation position in the current signal interval corresponding to the S-polarization state is denoted by $A^S_{ra}$, wherein the subscript ra represents a position of the first amplitude characteristic value before the perturbation position in the signal interval corresponding to the P-polarization state or the S-polarization state; and step D2: obtaining a second minimum amplitude value of each spatial position within the second spatial resolution width after the perturbation position in the current signal interval corresponding to the P-polarization state according to the P-polarization state amplitude distribution matrix, obtaining a second minimum amplitude value of each spatial position within the second spatial resolution width after the perturbation position in the current signal interval corresponding to the S-polarization state according to the S-polarization state amplitude distribution matrix, selecting a maximum amplitude value among all the second minimum amplitude values corresponding to the P-polarization state as the second amplitude characteristic value after the perturbation position in the current signal interval corresponding to the P-polarization state, wherein the second amplitude characteristic value after the perturbation position in the current signal interval corresponding to the P-polarization state is denoted by $A^P_{rb}$, and selecting a maximum amplitude value among all the second minimum amplitude values corresponding to the S-polarization state as the second amplitude characteristic value after the perturbation position in the current signal interval corresponding to the S-polarization state, wherein the second amplitude characteristic value after the perturbation position in the current signal interval corresponding to the P-polarization state is denoted by $A^S_{ra}$, wherein the subscript rb represents a position of the second amplitude characteristic value after the perturbation position in the signal interval corresponding to the P-polarization state or the S-polarization state.

4. The method according to claim 1, wherein options of the first and second polarization state phases before and after the perturbation position in each of the signal intervals in step E comprise:
(1) selecting a P-polarization state phase is before the perturbation position in the signal interval, and the P-polarization state phase is selected after the perturbation position;
(2) selecting the P-polarization state phase is before the perturbation position in the signal interval, and a S-polarization state phase is selected after the perturbation position;
(3) selecting the S-polarization state phase is before the perturbation position in the signal interval, and the P-polarization state phase is selected after the perturbation position; and
(4) selecting the S-polarization state phase is before the perturbation position in the signal interval, and the S-polarization state phase is selected after the perturbation position.

5. The method according to claim 2, wherein step D comprises:
performing separately step D1 to step D2 for each of the signal intervals of the P-polarization state amplitude distribution matrix and each of the signal intervals of the S-polarization state amplitude distribution matrix after the division, to obtain the first amplitude characteristic value, the second amplitude characteristic value, the position corresponding to the first amplitude characteristic value and the position corresponding to the second amplitude characteristic value within the first and second spatial resolution widths before and after the perturbation position in each of the signal intervals corresponding to the P-polarization state, and to obtain the first amplitude characteristic value, the second amplitude characteristic value, the position corresponding to the first amplitude characteristic value and the position corresponding to the second amplitude characteristic value within the first and second spatial resolution widths before and after the perturbation position in each of the signal intervals corresponding to the S-polarization state; and performing step E;

step D1: obtaining a first minimum amplitude value of each spatial position within the first spatial resolution width before the perturbation position in the current signal interval corresponding to the P-polarization state according to the P-polarization state amplitude distribution matrix, obtaining a first minimum amplitude value of each spatial position within the first spatial resolution width before the perturbation position in the current signal interval corresponding to the S-polarization state according to the S-polarization state amplitude distribution matrix, selecting a maximum amplitude value among all the first minimum amplitude values corresponding to the P-polarization state as the first amplitude characteristic value before the perturbation position in the current signal interval corresponding to the P-polarization state, wherein the first amplitude characteristic value before the perturbation position in the current signal interval corresponding to the P-polarization state is denoted by $A^P_{ra}$, and selecting a maximum amplitude value among all the first minimum amplitude values corresponding to the S-polarization state as the first amplitude characteristic value before the perturbation position in the current signal interval corresponding to the S-polarization state, wherein the first amplitude characteristic value before the perturbation position in the current signal interval corresponding to the S-polarization state is denoted by $A^P_{ra}$, wherein the subscript ra represents a position of the first amplitude characteristic value before the perturbation position in the signal interval corresponding to the P-polarization state or the S-polarization state; and step D2: obtaining a second minimum amplitude value of each spatial position within the second spatial resolution width after the perturbation position in the current signal interval corresponding to the P-polarization state according to the P-polarization state amplitude distribution matrix, obtaining a second minimum amplitude value of each spatial position within the second spatial resolution width after the perturbation position in the current signal interval corresponding to the S-polarization state according to the S-polarization state amplitude distribution matrix, selecting a maximum amplitude value among all the second minimum amplitude values corresponding to the P-polarization state as the second amplitude characteristic value after the perturbation position in the current signal interval corresponding to the P-polarization state, wherein the second amplitude characteristic value after the perturbation position in the current signal interval corresponding to the P-polarization state is denoted by $A^P_{rb}$, and selecting a maximum amplitude value among all the second minimum amplitude values corresponding to the S-polarization state as the second amplitude characteristic value after the perturbation position in the current signal interval corresponding to the S-polarization state, wherein the second amplitude characteristic value after the perturbation position in the current signal interval corresponding to the P-polarization state is denoted by $A^P_{rb}$, wherein the subscript rb represents a position of the second amplitude characteristic value after the perturbation position in the signal interval corresponding to the P-polarization state or the S-polarization state.

* * * * *